K. ALQUIST.
ELASTIC GEARING.
APPLICATION FILED AUG. 31, 1914.

1,203,549.

Patented Oct. 31, 1916.

Witnesses:

Inventor,
Karl Alquist,

UNITED STATES PATENT OFFICE.

KARL ALQUIST, OF SCHENECTADY, NEW YORK.

ELASTIC GEARING.

1,203,549.  Specification of Letters Patent.  Patented Oct. 31, 1916.

Application filed August 31, 1914. Serial No. 859,360.

*To all whom it may concern:*

Be it known that I, KARL ALQUIST, a subject of the King of Sweden, residing at Schenectady, in the county of Schenectady, State of New York, have invented certain new and useful Improvements in Elastic Gearing, of which the following is a specification.

The present invention relates to helical elastic spur gearing of the type built up from a number of disks or laminæ, which are firmly clamped or bolted together at their central portions and are free to move axially at the peripheries.

The invention refers more specially to gears built up from disks of comparatively great thickness. Such disks are, under certain conditions as to load and speed, liable to vibrate in a direction at right angles to the plane of the disks, and this vibration is from several points of view objectionable.

The object of the present invention is to provide means, forming part of the rotor, for preventing, damping, or absorbing such vibrations. Such means may consist in suitably forming or grouping the disks themselves so that they mutually dampen or destroy any vibrations set up, in providing in connection with the disks suitable substances which act in the desired manner, or in some combination of such means. The common principle for the various methods is that these means cause any vibration, which may start, to be exhausted in doing friction work instead of building up and gaining strength.

Figure 1:
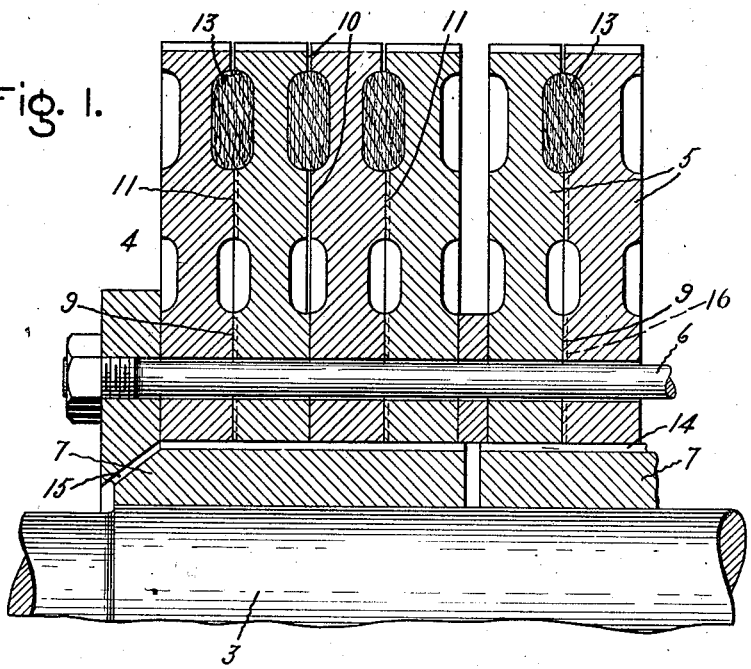
Figure 2:
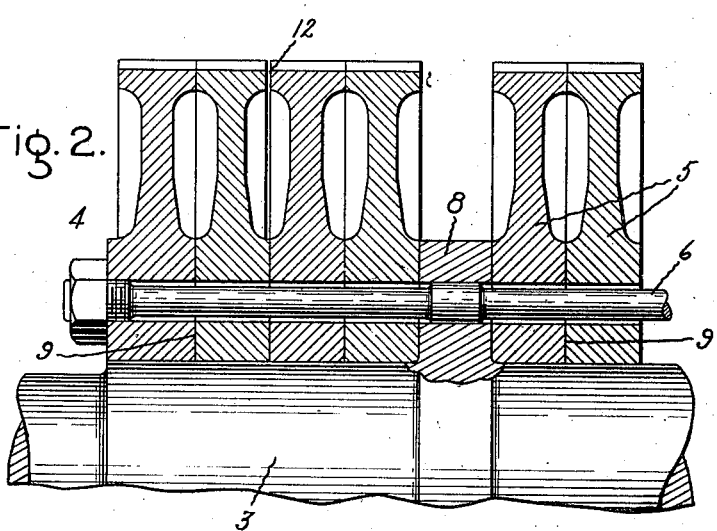

In the accompanying drawing, Figure 1 is a sectional view of a portion of an elastic gear wheel illustrating one form or embodiment of my invention, and Fig. 2 is a similar view of a further embodiment thereof.

Referring to Fig. 1, 3 indicates a shaft upon which is mounted an elastic gear wheel 4. The wheel comprises a plurality of disks or laminæ 5 firmly clamped together at their central portions by bolts 6. In this figure the disks are shown as mounted on sleeves 7 which in turn are made fast to the shaft in any suitable manner.

In Fig. 2 a general arrangement of parts similar to those of Fig. 1 is shown except that the sleeves 7 have been omitted, the disks being fastened directly to the shaft and a suitable spacing piece 8 being provided. I have accordingly used the same reference numerals to designate corresponding parts in both figures. As heretofore constructed these disks or laminæ have been spaced apart except at the central portion as indicated at 9. As already stated, however, under certain conditions of load and speed the same are liable to vibrate. According to one embodiment of my invention, I overcome this by forming and arranging the disks in groups or pairs, with the disks of each group or pair in contact at points where relative movement occurs when the disks vibrate. Referring to Fig. 1, I have shown the disks arranged in groups of two, *i. e.*, in pairs, the groups being spaced apart from each other as indicated at 10, and the disks of each group being in contact at an intermediate point as shown at 11. In other words, instead of providing complete clearance between all the disks as heretofore, I provide complete clearance between part of them and only partial clearance between the rest. In Fig. 2 the intermediate contacting surfaces 11 are dispensed with and the corresponding action is obtained by only making clearances at every second or more disk as shown at 12.

In addition to the arrangement shown in Figs. 1 and 2, or in lieu thereof, I may prevent vibration by introducing between the disks semi-elastic substances, such as felt, cloth, raw-hide, fiber, and the like, as shown at 13 in Fig. 1. These substances will be periodically compressed and expanded under the vibrations and thereby dampen the vibrations. I may also introduce oil or other liquid at the central portions of the wheel by means of grooves 14 and 15 as shown in Fig. 1, and it will be understood that such liquids will in the various cases increase the damping effect, the liquid flowing under the centrifugal force outward between the disks, suitable passages, as indicated at 16, being provided where necessary.

I may use the methods described singly or together or in any combination, and it will be understood that the disks may be shaped and arranged in various ways for the purpose set forth without departing from the spirit of the invention, and that the examples given do not exhaust the modifications possible.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means within the scope of the appended claims.

What I claim as new and desire to secure by Letters Patent of the United States, is:—

1. The combination with a rotor comprising an elastic spur gear wheel built up from disks or laminæ which are spaced apart at their outer portions so as to be capable of axial movement at the periphery, of means forming part of the rotor for preventing, damping, or absorbing vibration of the disks or laminæ.

2. In combination, a gear wheel comprising a plurality of disks or laminæ clamped in contact with each other at their central portions, and spaced apart at their outer portions, and means forming part of the disks or laminæ for preventing, damping or absorbing vibrations of the disks or laminæ.

3. An elastic spur gear wheel built up from disks or laminæ clamped in contact with each other at their central portions and arranged in groups which are spaced from each other at their outer portions, the disks or laminæ of the respective groups being in contact at portions outside the center so as to mutually absorb vibrations.

4. In an elastic spur gear wheel built up from a plurality of disks or laminæ clamped in contact with each other at their central portions and spaced apart at their outer portions so as to be capable of axial movement, means for preventing or damping vibrations of the disks which consists in providing certain of the disks with contacting surfaces adjacent their outer portions and in providing packings of semi-elastic substances between the disks.

5. In an elastic spur gear wheel built up from a plurality of disks or laminæ clamped in contact with each other at their central portions and spaced apart at their outer portions so as to be capable of axial movement, means for preventing or damping vibrations of the disks comprising packings of semi-elastic substances arranged between the disks.

6. An elastic gear wheel built up from disks or laminæ clamped in contact with each other at their central portions and spaced apart at their outer portions and having axially extending openings through which liquid may be forced and from which it may be thrown by centrifugal force out between the disks for damping vibrations.

7. In an elastic spur gear wheel built up from a plurality of disks or laminæ clamped in contact with each other at their central portions and spaced apart at their outer portions so as to be capable of axial movement, means for preventing or damping vibrations of the disks which consists in providing some of the disks with contacting surfaces adjacent their outer portions and in providing axially extending openings adjacent the center of the gear wheel through which liquid may be forced and from which it may be thrown by centrifugal force out between the disks.

8. An elastic spur gear wheel comprising a hub section, a plurality of disks or laminæ mounted thereon, the outer portions of which are slightly spaced apart, the outer portions of certain of said disks being provided throughout a limited area with a thickened portion whereby certain of said disks are in contact with each other at points outside the center, and packings of semi-elastic material located between the disks.

9. An elastic spur gear wheel comprising a hub section, a plurality of disks or laminæ mounted thereon, the outer portions of which are slightly spaced apart, the outer portions of certain of said disks being provided throughout a limited area with a thickened portion whereby certain of said disks are in contact with each other at points outside the center, said gear wheel being provided with openings through which a liquid may be inserted between the disks, and packings of semi-elastic material located between the disks.

10. An elastic spur gear wheel comprising a hub section, a plurality of disks or laminæ mounted thereon, the central portion of said disks or laminæ being in fixed relation to each other, and the outer portions being slightly spaced apart, said gear wheel being provided with openings through which a liquid may be admitted between the disks, and packings of semi-elastic material located between the disks.

11. An elastic spur gear wheel comprising a hub section, a plurality of disks or laminæ mounted thereon, the outer portions of which are slightly spaced apart, the outer portions of certain of said disks being provided throughout a limited area with a thickened portion whereby certain of said disks are in contact with each other at points outside the center.

In witness whereof, I have hereunto set my hand this 28th day of August, 1914.

KARL ALQUIST.

Witnesses:
HELEN ORFORD,
MARGARET E. WOOLLEY.